US011618324B2

(12) United States Patent
Sosnowski et al.

(10) Patent No.: US 11,618,324 B2
(45) Date of Patent: Apr. 4, 2023

(54) ELECTRIC UTILITY VEHICLE POWER CONTROL

(71) Applicant: THE TORO COMPANY, Bloomington, MN (US)

(72) Inventors: Timothy Patrick Sosnowski, Eden Prairie, MN (US); Erik Daniel Low, Minneapolis, MN (US)

(73) Assignee: THE TORO COMPANY, Bloomington, MN (US)

( * ) Notice: Subject to any disclaimer, the term of this patent is extended or adjusted under 35 U.S.C. 154(b) by 209 days.

(21) Appl. No.: 17/060,561

(22) Filed: Oct. 1, 2020

(65) Prior Publication Data

US 2021/0094420 A1 Apr. 1, 2021

Related U.S. Application Data

(60) Provisional application No. 62/924,293, filed on Oct. 22, 2019, provisional application No. 62/909,012, filed on Oct. 1, 2019.

(51) Int. Cl.
*B60L 1/00* (2006.01)
*H02P 3/18* (2006.01)
*B60L 50/00* (2019.01)

(52) U.S. Cl.
CPC ............... *B60L 1/003* (2013.01); *B60L 50/00* (2019.02); *H02P 3/18* (2013.01)

(58) Field of Classification Search
None
See application file for complete search history.

(56) References Cited

U.S. PATENT DOCUMENTS

| 5,388,176 | A | 2/1995 | Dykstra et al. |
| 5,906,088 | A | 5/1999 | Inui et al. |
| 5,937,622 | A | 8/1999 | Carrier et al. |
| 6,354,678 | B1 * | 3/2002 | Oertley ................. B62D 55/30 305/144 |
| 6,554,082 | B2 | 4/2003 | Bischel et al. |
| 6,750,622 | B2 | 6/2004 | Simizu et al. |
| 7,594,377 | B1 | 9/2009 | Jansen et al. |
| 2012/0228041 | A1 | 9/2012 | Borinato |

(Continued)

OTHER PUBLICATIONS

Toro Groundsmaster 5900/5910, Large Area Rotary Mowers, Specification Sheet, 2017, 4 pages.

*Primary Examiner* — Jared Fureman
*Assistant Examiner* — Joel Barnett
(74) *Attorney, Agent, or Firm* — Mueting Raasch Group

(57) ABSTRACT

A control system and method of controlling a utility vehicle. The system may include a controller, an energy mode input associated with a user input request to select one of at least two power modes, an implement control input associated with a user input request to select a movement of an implement, a drive control input associated with a user input request to select a movement of a drive system to propel the utility vehicle, and an attachment type input to further refine the allowed operating power states. The controller is adapted to determine a change between the plurality of operating power states in response to user input requests to automatically optimize machine performance and efficiency. Each of the plurality of operating power states includes a maximum electric current output and a maximum speed output of the electric motor.

19 Claims, 11 Drawing Sheets

(56) References Cited

U.S. PATENT DOCUMENTS

| | | | |
|---|---|---|---|
| 2013/0280111 A1* | 10/2013 | Hoxie | E02F 9/2217 |
| | | | 417/364 |
| 2015/0006010 A1* | 1/2015 | Ito | E02F 9/2235 |
| | | | 903/930 |
| 2016/0207418 A1* | 7/2016 | Bergstrom | B60G 3/08 |
| 2018/0195595 A1* | 7/2018 | Huang | F16H 37/06 |
| 2020/0023740 A1* | 1/2020 | Bystedt | E02F 9/2091 |

* cited by examiner

ELECTRIC UTILITY VEHICLE POWER CONTROL

This application claims the benefit of U.S. Provisional Application No. 62/909,012, filed Oct. 1, 2019, and U.S. Provisional Application No. 62/924,293, filed Oct. 22, 2019, which are incorporated herein by reference in their entireties.

Embodiments of the present disclosure relate to utility vehicles that are electrically powered and, more particularly to systems and methods for controlling power for use with the same.

BACKGROUND

Utility vehicles or "loaders" such as skid-steer loaders are well known for use in various applications including construction and landscaping. Such vehicles are generally configured with either a dedicated tool (e.g., bucket/loader, trencher, etc.) or with a connection mechanism to permit attachment of any one of a variety of tools. While utility vehicles are available in a wide range of sizes, compact stand-on or walk-behind utility loaders (also referred to herein simply as "SOWB" loaders or vehicles) are popular in many applications. Unlike larger skid steer loaders, SOWB vehicles typically do not carry a user in a seated position. Instead, SOWB vehicles are most often operated by a user who stands on a platform attached to the rear of the vehicle or, alternatively, walks on the ground behind the vehicle. As a result of their smaller size, SOWB loaders are able to navigate through tighter spaces (e.g., gates, doors, and other limited openings) that would restrict passage of larger loaders.

SOWB loaders typically utilize internal combustion engines and are well-suited for performing work in an outdoor environment where the accompanying noxious fumes (e.g., gas or diesel) produced by the engines are released to an open-air environment. Such emissions, however, may restrict such SOWB loaders from operation within interior environments.

More recently, electric motors have become available in a variety of mowers and other turf vehicles in both consumer and professional markets alike. While effective, performance characteristics of energy sources (e.g., lithium ion batteries) associated with electric motors may require changes in vehicle operation as compared to vehicles using internal combustion engines. For example, while electric motors may have increased energy efficiency over a conventional internal combustion engine, it may consume its on-board energy much more quickly (e.g., due to the lower energy density of batteries) than the conventional internal combustion engine (in a similar application) might deplete its fuel (e.g., gasoline) source with a much higher energy density. As recharging (or replacement) of the energy source can be time consuming and cause unwanted delays, vehicles with electric motors may be perceived by some users as undesirable. It is thus important for an electric-motor powered, battery-fueled machine to be as efficient as possible with energy during use.

SUMMARY

Embodiments described herein can provide a utility vehicle that may incorporate various aspects in any combination. In one aspect, a control system of the utility vehicle may include: a controller with memory to store instructions and a processor to process the instructions to select one of a plurality of operating power states of the utility vehicle. In another aspect, the utility vehicle has an electric motor and a hydraulic pump. In another aspect, the control system includes an energy mode input electrically coupled to the controller to provide a power state input signal indicative of a user input request to select one of at least two power modes. In another aspect, the control system includes an implement control input electrically coupled to the controller to provide an implement movement signal indicative of a user input request to select a movement of an implement. In another aspect, the control system includes a drive control input electrically coupled to the controller to provide a drive signal indicative of a user input request to select a movement of a drive system to propel the utility vehicle. In still another aspect, the controller is adapted to determine a change from one of the plurality of operating power states to another of the plurality of operating power states in response to at least one user input request to select a movement of at least one of the implement and the drive system indicating a reduction of power consumption. In still another aspect, each of the plurality of operating power states has a maximum electric current output and a maximum speed output of the electric motor.

In still another aspect, the at least two power modes may include an energy conservation mode and a normal energy mode. In still another aspect, a creep mode input may be included. In still another aspect, the controller is adapted to determine a change from one of the plurality of operating power states to another of the plurality of operating power states in response to a status of input signals during a predetermined duration. In still another aspect, the plurality of operating power states may include a first power state having a maximum available electric current output and a maximum available speed output of the electric motor, and an intermediate power state having at least one of the electric current outputs and speed outputs of the electric motor less than the maximum available electric current output and speed output of the electric motor. In still another aspect, the plurality of operating power states may further include a final power state wherein the maximum electric current output of the electric motor is 0 Amps root mean square and the maximum speed output is 0 revolutions per minute. In still another aspect, the user input may be to select a movement of at least one of the implement and the drive system indicating an increase or decrease in power consumption. In still another aspect, the controller is adapted to determine a change to another of the plurality of operating power states in response to a user input to indicate a change in traction or implement movement. In yet another aspect, the system may include an attachment configuration, wherein the controller is adapted to modify the plurality of operating power states of the utility vehicle based on the attachment configuration.

In another embodiment, a utility machine is provided that includes various aspects in any combination. In one aspect, the utility machine may include a frame having a front end and a rear end; an electric motor; a hydraulic pump coupled to the electric motor; a drive system to propel the utility machine over a ground surface, the drive system to receive power from the hydraulic pump; an implement system including an implement operable with hydraulic power received from the hydraulic pump; first and second control inputs to receive user input corresponding to one or more operational parameters of the drive system and the implement system; and an energy mode input. In another aspect, the utility machine may include input sensors configured to detect manipulation of the energy mode input and the first and second control inputs, respectively, and generate a corresponding energy mode input signal and first and second input signals. In another aspect, the utility machine may include an electronic controller configured to receive an energy mode input signal and a signal representing one or more operational parameters of the vehicle. In another aspect, the controller may be adapted to determine electric motor power consumption limits based upon the energy mode input signal and the signal representing the one or more operational parameters. In still another aspect, the power may be automatically adjusted based on a second signal representing a change in operational parameters.

In still another aspect, the implement of the utility machine may be a reciprocating hammer. In yet another aspect, the utility machine may include a battery energy source to power the electric motor. In another aspect, the electronic controller may be adapted to modify the power consumption limits based on an attachment configuration, wherein the implement may define the attachment configuration. In another aspect, the energy mode input may include an energy conservation mode and a normal energy mode. In yet another aspect, the electronic controller may be adapted to change from one power consumption limit to another power consumption limit in response to the signal representing the one or more operational parameters during a predetermined duration.

In yet another embodiment, a non-transitory computer-readable data storage medium storing instructions executable by a processor is provided that includes various aspects in any combination. In one aspect, the non-transitory computer-readable data storage medium may define utility vehicle power modes comprising an energy conservation mode (i.e., "eco" mode) and a normal energy mode; define activity modes selectable by a user, the activity modes including a drive mode and an implement mode; and define a plurality of operating power states to selectively provide power to the utility vehicle corresponding to the utility vehicle power modes and the activity modes. In another aspect, each of the plurality of operating power states may be configured to provide power output to reduce power waste.

In still another embodiment, a method of controlling a utility machine is provided that includes various aspects in any combination. In one aspect, the method may include selecting one of at least two utility vehicle power modes including an energy conservation mode and a normal energy mode; selecting one of at least two activity modes including a drive mode and an implement mode; and providing a power output to at least one of a drive system and an implement system, wherein the power output corresponds to one of a plurality of operating power states based on the selected utility vehicle power mode and selected activity mode to reduce power waste.

In another aspect, the operating power states may define a maximum electric current output and a maximum speed output of an electric motor. In yet another aspect, the method may include modifying the plurality of operating power states based on an attachment configuration of the utility machine. In still another aspect, the method may include changing from one of the plurality of operating power states to another of the plurality of operating power states in response to input signals of the selected activity mode during a predetermined duration.

The above summary is not intended to describe each embodiment or every implementation. Rather, a more complete understanding of illustrative embodiments will become apparent and appreciated by reference to the following Detailed Description of Exemplary Embodiments and claims in view of the accompanying figures of the drawing.

BRIEF DESCRIPTION OF THE VIEWS OF THE DRAWING

Exemplary embodiments will be further described with reference to the figures of the drawing, wherein.

Figure 1:
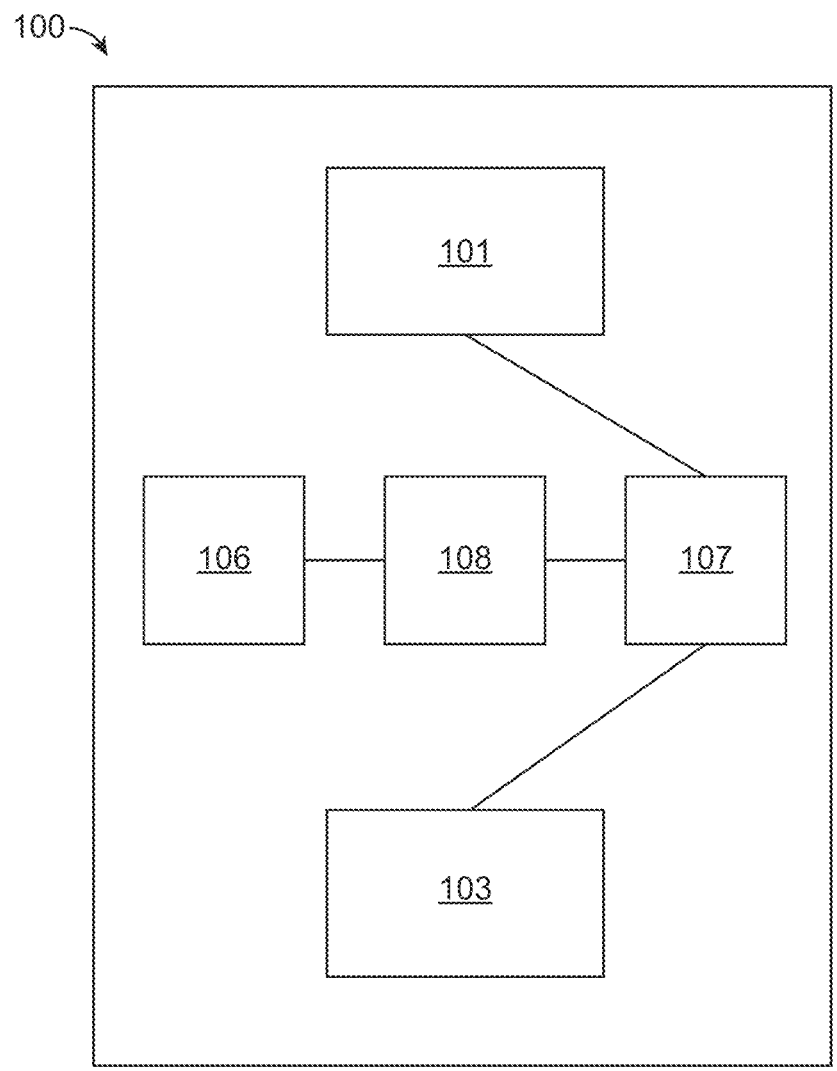
FIG. 1 is a schematic view of a utility vehicle in accordance with embodiments of the present disclosure.

The figures are rendered primarily for clarity and, as a result, are not necessarily drawn to scale. Moreover, various structure/components, including but not limited to fasteners, electrical components (wiring, cables, etc.), and the like, can be shown diagrammatically or removed from some or all of the views to better illustrate aspects of the depicted embodiments, or where inclusion of such structure/components is not necessary to an understanding of the various exemplary embodiments described herein. The lack of illustration/description of such structure/components in a particular figure is, however, not to be interpreted as limiting the scope of the various embodiments in any way.

DETAILED DESCRIPTION OF EXEMPLARY EMBODIMENTS

In the following detailed description of illustrative embodiments, reference is made to the accompanying figures of the drawing which form a part hereof. It is to be understood that other embodiments, which may not be described and/or illustrated herein, are certainly contemplated.

All headings provided herein are for the convenience of the reader and should not be used to limit the meaning of any text that follows the heading, unless so specified. Moreover, unless otherwise indicated, all numbers expressing quantities, and all terms expressing direction/orientation (e.g., vertical, horizontal, parallel, perpendicular, etc.) in the specification and claims are to be understood as being modified in all instances by the term "about." The term "and/or" (if used) means one or all of the listed elements or a combination of any two or more of the listed elements. "I.e." is used as an abbreviation for the Latin phrase id est and means "that is." "E.g.," is used as an abbreviation for the Latin phrase exempli gratia and means "for example."

Figure 2:
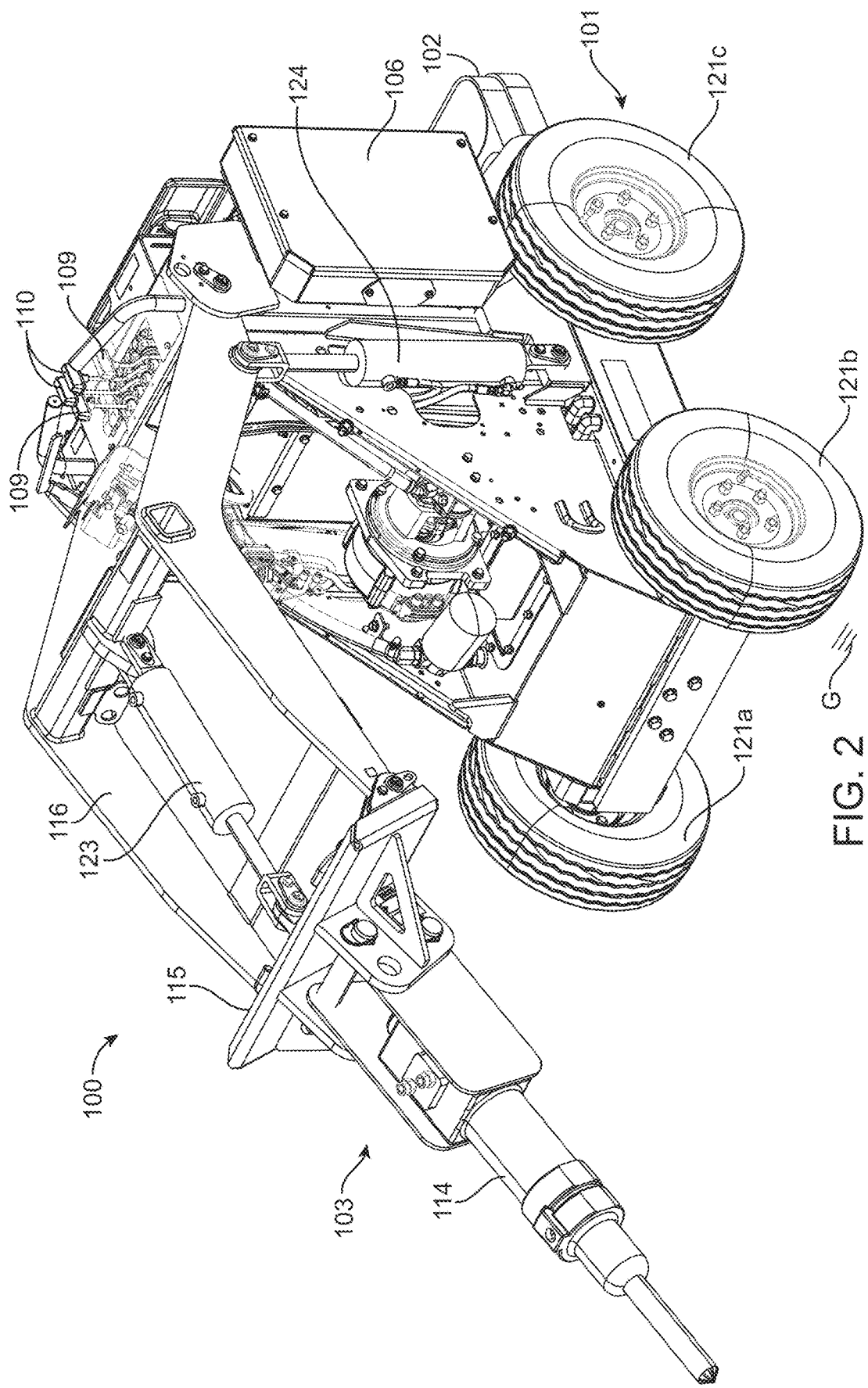
FIG. 2 is a perspective view of a utility vehicle in accordance with embodiments of the present disclosure.
Figure 3:
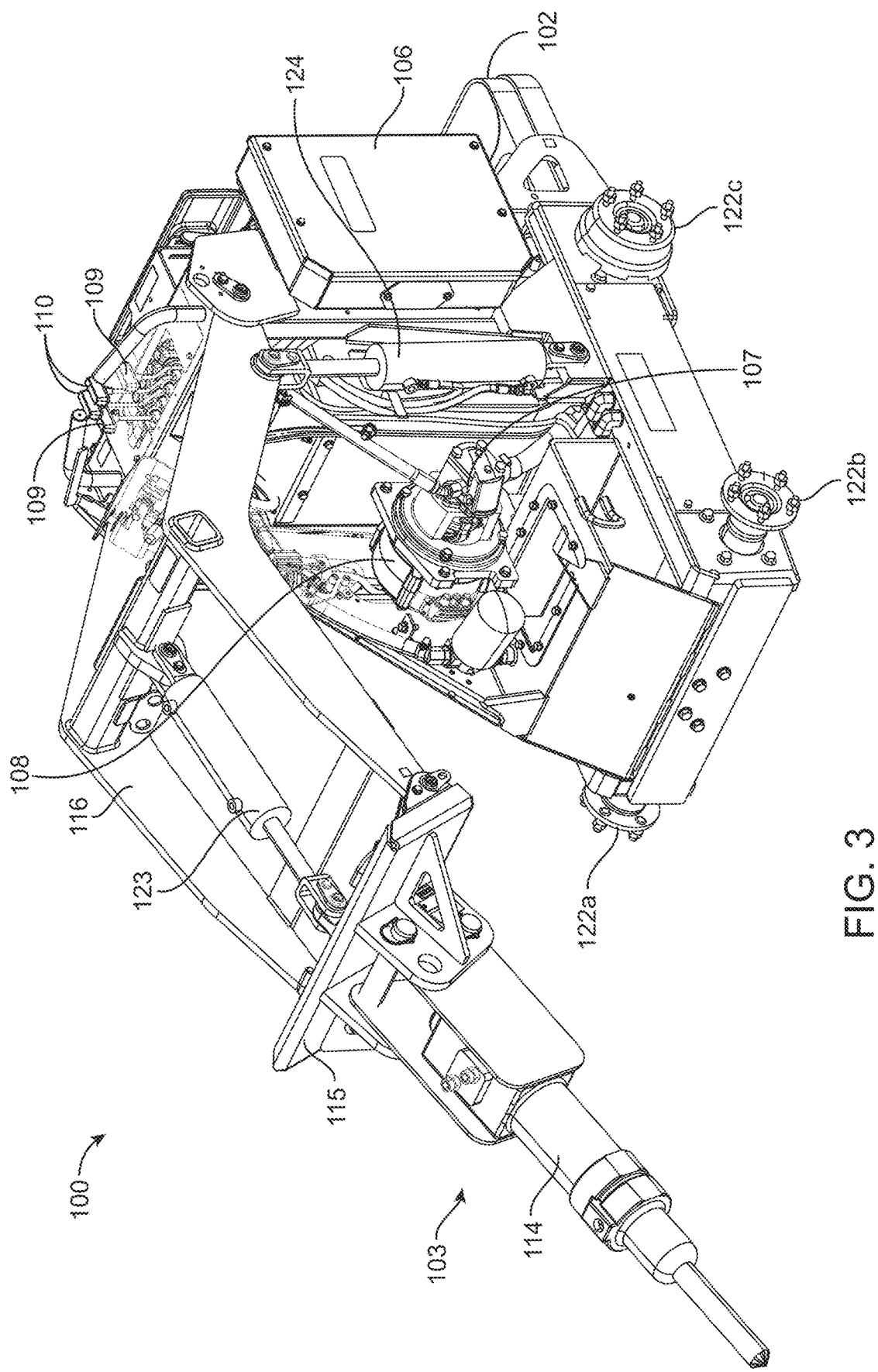
FIG. 3 is a view similar to FIG. 2, but with portions of the vehicle removed for clarity.
Figure 4:
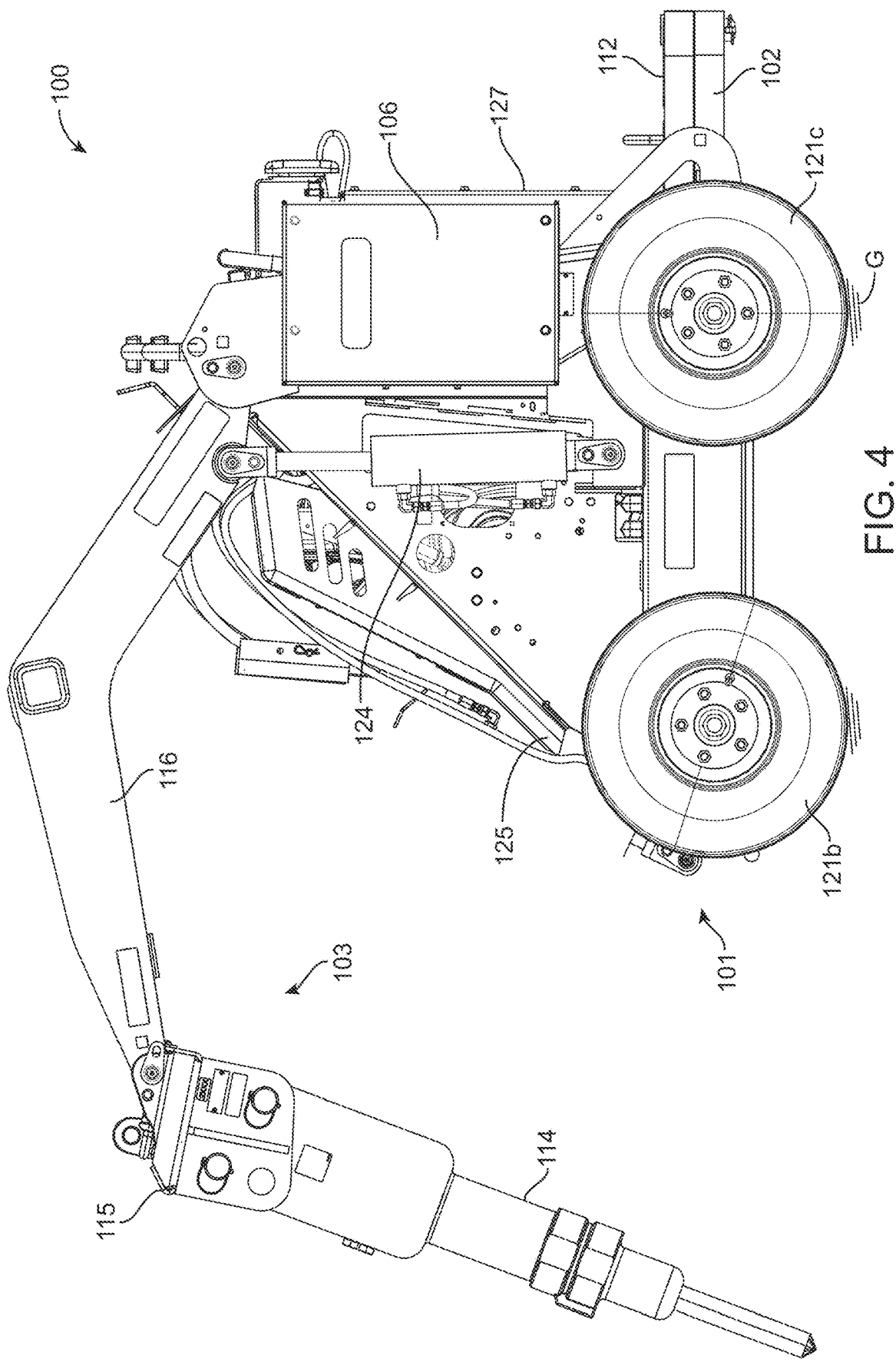
FIG. 4 is a side view of a utility vehicle in accordance with embodiments of the present disclosure.

With reference to the figures of the drawing, wherein like reference numerals designate like parts and assemblies throughout the several views, FIGS. 2-4 illustrate a utility vehicle 100 in accordance with exemplary embodiments of the present disclosure. While shown in these views as a self-propelled, stand-on utility vehicle 100 (also referred to herein simply as a "vehicle" or "machine"), such a configuration is not limiting. That is, while embodiments are described herein with respect to a stand-on utility vehicle, those of skill in the art will realize that this disclosure is equally applicable to other types of vehicles (e.g., walk-behind or sit-on), as well as to other types of wheeled or tracked maintenance vehicles (e.g., mowers, debris management systems (e.g., blowers, vacuums, sweeper, etc.), general purpose utility vehicles or machines, and the like) without limitation. That is to say, the terms "utility vehicle" or "utility machine" are understood herein to include utility vehicles or machines intended for operation upon either or both of turf (e.g., grass) and non-turf (e.g., concrete) surfaces.

It is noted that the terms "have," "includes," "comprises," and variations thereof do not have a limiting meaning and are used in the open-ended sense to generally mean "including, but not limited to," where the terms appear in the accompanying description and claims. Further, "a," "an," "the," "at least one," and "one or more" are used interchangeably herein. Moreover, relative terms such as "left," "right," "front," "fore," "forward," "rear," "aft," "rearward," "top," "bottom," "side," "upper," "lower," "above," "below," "horizontal," "vertical," and the like can be used herein and, if so, are from the perspective of one operating the vehicle 100 while the vehicle 100 is in an operating configuration, e.g., while the vehicle 100 is positioned on a ground surface G as shown in FIG. 2. These terms are used only to simplify the description, however, and not to limit the interpretation of any embodiment described.

Embodiments of the present disclosure are directed to utility vehicles including electric motors and methods for operating the same. The utility vehicle can include an energy source (e.g., battery) to supply energy to the electric motor. The energy source can include one or both of a generator and a battery. In some embodiments, the battery is rechargeable while onboard. In other embodiments, the battery can be replaced, or exchanged, when depleted. Embodiments of the present disclosure include systems and methods to conserve energy of the energy source during operation of the utility vehicle.

While the general construction of the vehicle 100 is not necessarily central to an understanding of exemplary embodiments (e.g., other vehicle configurations are certainly contemplated), the general construction of the exemplary vehicle 100 is briefly described below.

The vehicle 100 can include a chassis or frame 102 to support a traction system 101 (e.g., ground-engaging members) and an implement system 103 (e.g., operating tool, actuators, etc.) thereon. Further, the chassis or frame 102 may be supported upon the ground surface "G" by independently driven ground-engaging members 121. The vehicle may include any suitable number of ground-engaging members 121. For example, in one embodiment, include first, second, third, and fourth ground-engaging drive members or wheels. Specifically, the vehicle 100 may include right front wheel 121a, left front wheel 121b, left rear wheel 121c, and right rear wheel 121d (not shown), which may be collectively referred to herein as driven members or wheels 121. The traction system 101 can further include separate hydraulic wheel motors 122a-122d (122a-122c shown in FIG. 3; collectively "122" in FIG. 6) connected to the drive wheels 121a-121d, respectively, and powered by an electric motor 108 (e.g., via a pump 107), so that the traction system 101 can provide power independently to each of the drive wheels 121 and thus rotate the drive wheels (relative to the frame 102) to selectively propel and steer the vehicle 100 over the ground surface G. Of course, other drive configurations (e.g., actively steered front or rear wheels, tri-wheel configurations, front-wheel-only or rear-wheel-only drive, etc.) and vehicles using ground-engaging members other than wheels (e.g., tracks, rollers), are certainly contemplated within the scope of this disclosure.

Figure 5:
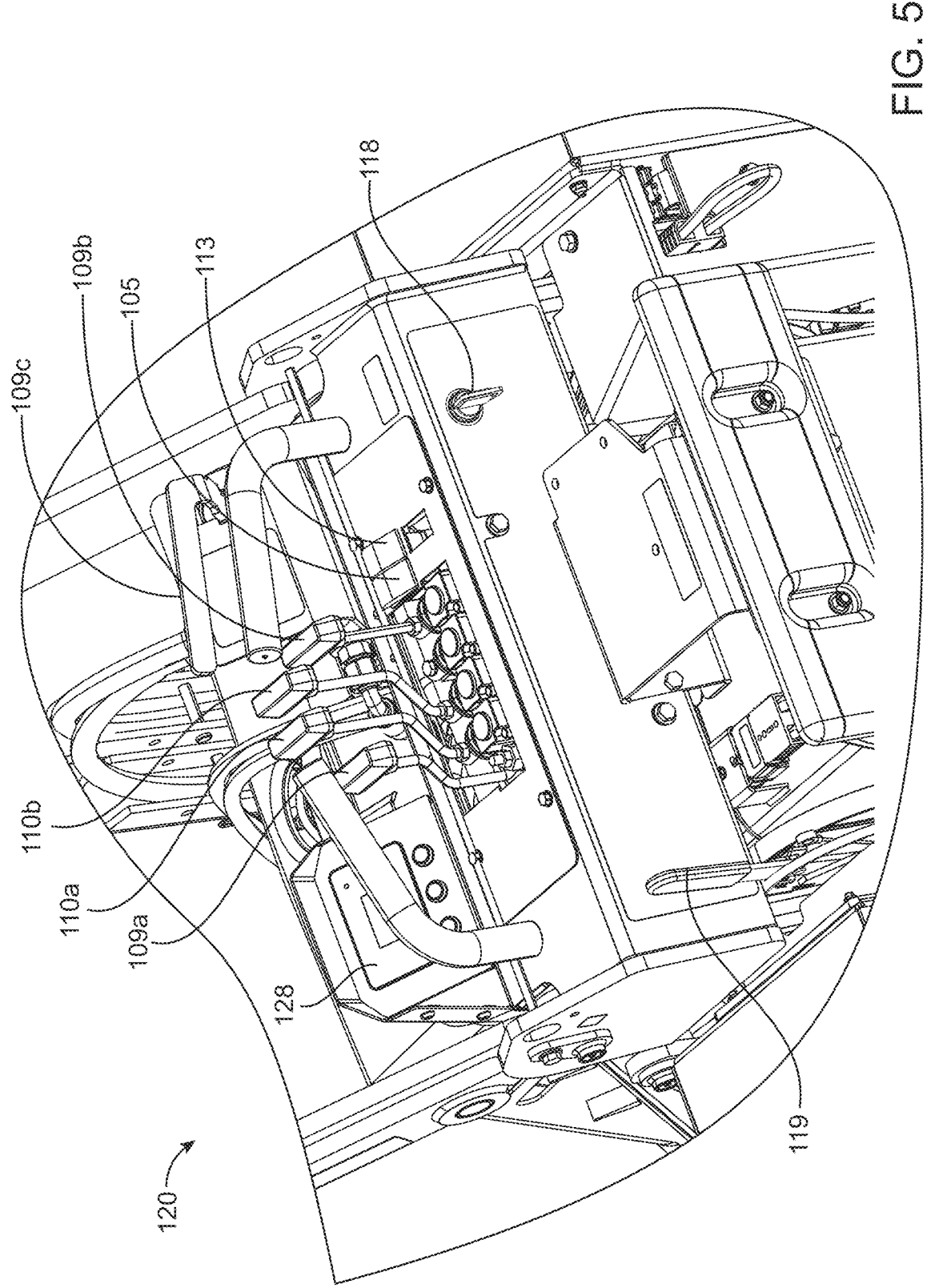
FIG. 5 is a partial perspective view of the utility vehicle of FIG. 2 illustrating portions of a control system in accordance with embodiments of the present disclosure.

FIG. 5 illustrates an exemplary control panel 120 including various user inputs (e.g., control levers, knobs, joystick, push buttons, etc.) for ease of user manipulation and control while standing on an operator platform 112 or walking behind the vehicle. The platform 112 is shown in a deployed position in FIG. 4 to receive the standing operator. In some embodiments of the vehicle 100, the platform 112 could fold upwardly against a back side of the frame 102 to permit operation by an operator walking behind the vehicle 100.

For example, the implement system 103 can be controlled by the user with implement control inputs 109a-109c (collectively inputs "109"), which may be located at the control panel 120. In addition, an input display 128 can be included as part of or in addition to the implement control inputs 109 in order to provide user selection of the implement type (e.g., auger, hammer, chainsaw, backhoe, stump grinder, ground leveler, etc.) that is to be controlled (e.g., which changes the way the vehicle 100 consumes energy). As a result, the system 100 may provide or utilize a specific attachment configuration corresponding to the selected implement type (e.g., based on the implement type presently attached to the vehicle). Also, for example, the input display 128 may provide visual notifications to the user. In addition, the traction system 101 can be controlled by the user with the drive control inputs 110a, 110b (collectively inputs "110"), which may be located at the control panel 120. The control panel 120 can include a power mode input 105 to provide the user selective limitation of power consumption, and thus extended work capacity, during operation of the vehicle. Other controls and inputs can also be positioned at or near the control panel 120. For example, a power on/off switch or input 118 and a parking brake 119 can be included at, or near, the control panel 120.

The traction system 101 can control the drive wheels 121 to move the vehicle 100 in a user-specified speed and direction. With reference to FIG. 5, to operate the drive wheels 121 (via the associated independent wheel motors 122 in FIG. 6), hydraulic power is selectively delivered to the wheel motors 122 in proportion to movement of a drive control input 110 (e.g., located on the control panel 120). The traction system 101 can be electrically and/or hydraulically coupled to one or more control inputs 110, e.g., first (e.g., left) control input (configured as drive control lever 110a in FIG. 5) and second (e.g., right) control input (configured as drive control lever 110b in FIG. 5). The drive control levers 110 are movably (e.g., pivotally) coupled to the frame 102 such that they can pivot forwardly and rearwardly under the control of an operator, or user, standing on an operator platform 112.

The control inputs (e.g., drive control levers 110) are operable to independently control speed and direction of their respective left and right drive wheels 121 via manipulation of the traction system 101. For example, the drive control levers 110 (110a, 110b) can each be independently movable such that movement of the control levers 110 forwardly from an intermediate neutral position toward a forward position results in an increase in speed of the associated drive wheels 121. Specifically, moving the left drive control lever 110a from a neutral position to a forward position can generally result in the left drive wheels 121b, 121c accelerating, in proportion to the position of the left drive control lever, from zero to a maximum forward speed of the left drive wheels. Similarly, movement of the drive control lever 110a from the neutral position to a rearward position can generally result in the left drive wheels 121b, 121c accelerating, in proportion to the position of the left drive control lever, from zero to a maximum rearward speed of the left drive wheel. Speed and rotational direction of the drive wheels are thus variable such that the vehicle can move forwards, backwards, and execute turns including small- (or near zero-) radius turns.

As stated herein, the implement system 103 includes the implement 114 (e.g., a reciprocating hammer) adapted to perform a particular task. Although shown as carried at the front end 125 of the frame 102, in some embodiments the implement 114 can be carried at the rear end 127 of the frame 102. Moreover, while shown as a reciprocating hammer, other types of implements (e.g., auger, chainsaw, backhoe, stump grinder, ground leveler, etc.) are also contemplated.

In addition to the implement itself, the implement system 103 may include arm assembly 116 and various other components used to connect and operate the implement system. In some embodiments, the arm assembly 116 includes a pair of arms positioned on opposite sides of the frame 102. The arms can be pivotally connected to the frame 102 to raise and lower the implement 114. FIGS. 2-3 illustrate the implement 114 connected to the arms 116 via an attachment plate 115 and in a position prior to a ready-for-use position. In the ready-for-use position (e.g., as shown in FIG. 4), the implement 114 is positioned to perform its intended task (e.g., hammering a ground area). Hydraulic actuators 124 (although only left side actuator is illustrated in FIGS. 2-3, a cylinder 124 may be provided on the right side of the frame 102 as well) can be connected to the arms to raise and lower the arm assembly 116 relative to the frame. In addition, a hydraulic actuator 123 may be provided and adapted to pivot the attachment plate 115. The attachment plate 115 is pivotally coupled to the end of the arm assembly 116 and supports the implement 114. By extending and retracting the cylinder 123, the plate 115/implement 114 may be rotated ("curled" or extended) relative to the arm assembly as desired for transport and operation. Moreover, extension and retraction of the cylinders 124 may allow lifting and lowering, respectively, of the arm assembly 116/implement 114.

The implement system 103 may be electrically and/or hydraulically coupled to the implement control input 109 (see, e.g., FIGS. 2-5) to allow control of the implement 114. For example, separate implement control inputs 109a-109c (collectively control input(s) 109) can be operated along fore and aft axes, e.g., each may be pushed forwardly out of neutral or pulled rearwardly out of neutral. Specifically, input 109a can be manipulated by the user to raise and lower arm assembly 116/implement 114, input 109b can be manipulated to tilt the plate 115/implement 114 toward and away from the user. Also, in one embodiment, another input 109c can be provided to control activation of the implement 114, such as rotation of an auger or reciprocation of the hammer. For example, in use, the implement system 103 may reciprocate the implement 114 (e.g., hammer) to penetrate and demolish ground and other structures in response to manipulation of input 109c.

While illustrated herein as incorporating separate drive control inputs 110 and implement control inputs 109 embodied as levers (and the power on/off input 118 is shown as a keyed ignition), other controls, e.g., single or multiple joysticks or joystick-type levers, steering wheel, trackpad, touchscreen, rotatable dial or knob, etc., can also be used without departing from the scope of the disclosure. Additionally or alternatively, radio frequency (RF) controls can be used. In fact, any user controls capable of communicating user intent (e.g., various operator inputs to the implement system 103) is contemplated. Although these and other user inputs/controls are certainly contemplated, embodiments are, for the sake of brevity and without limitation, described and illustrated herein as dual drive control levers.

As schematically illustrated in FIG. 1, and with additional reference to FIGS. 2-4, the vehicle 100 can further include an energy source 106, the electric motor 108, and the hydraulic pump 107 to provide power to the traction system 101 and the implement system 103. The vehicle 100 can also include a control system 104 (see, e.g., FIG. 6) including a power mode selector, or input, 105 (see also, e.g., FIG. 5) to provide power mode options including an energy conservation mode and a normal mode, as discussed further below.

During operation of the vehicle 100, power is selectively limited for use by the traction system 101 and/or the implement system 103, based, in part, on the power mode selected. In some embodiments, the electric motor 108 can be coupled to the hydraulic pump 107, the latter adapted to provide pressurized hydraulic fluid to one or more hydraulic systems, for example, the traction system 101 and/or the implement system 103 (e.g., reciprocating hammer, auger, or other operating tool). The hydraulic pump 107 can include one or more fixed or variable displacement pumps. As used herein, the implement system 103 may include not only the operating tool, but also various actuators (e.g., 123 and 124; see FIG. 2) used to position the operating tool.

In some embodiments, the vehicle 100 is a stand-on or walk-behind (SOWB) utility vehicle including the traction system 101 having differentially driven wheels. That is, each wheel can be driven by independent hydraulic motors (see, e.g., motor 122 in FIG. 6). The exemplary implement system 103 is hydraulically powered by the vehicle to provide both implement control (e.g., hammering) and movement of the implement (e.g., raising/lowering and curling in/out). The control system 104 includes an electronic controller (EC 200) to determine operation of the utility vehicle in one of a plurality of operating power states corresponding to one of the power modes (e.g., energy conservation mode and normal mode). The EC may operatively control the rate of power supply to the traction system 101 and the implement system 103, based on the determined operating power state, as described further below. In some embodiments, an implement or tool 114 (e.g., hammer, auger, etc.) of the implement system 103 can be interchangeably attached to the vehicle 100. As such, the control system may include an attachment configuration or selector that is adapted to modify the plurality of operating power states (e.g., because different implements/tools have different energy consumption patterns). For example, the power profile (e.g., current and speed output of the motor 108) of the plurality of operating power states may be adjusted depending on the type of implement or tool attached. In other words, the attachment configuration (e.g., hammer, auger, etc.) of the control system may correspond to the attached implement or tool. The attachment configuration may be engaged or changed automatically (e.g., in response to new implement attached) or manually (e.g., in response to user input).

Figure 6:
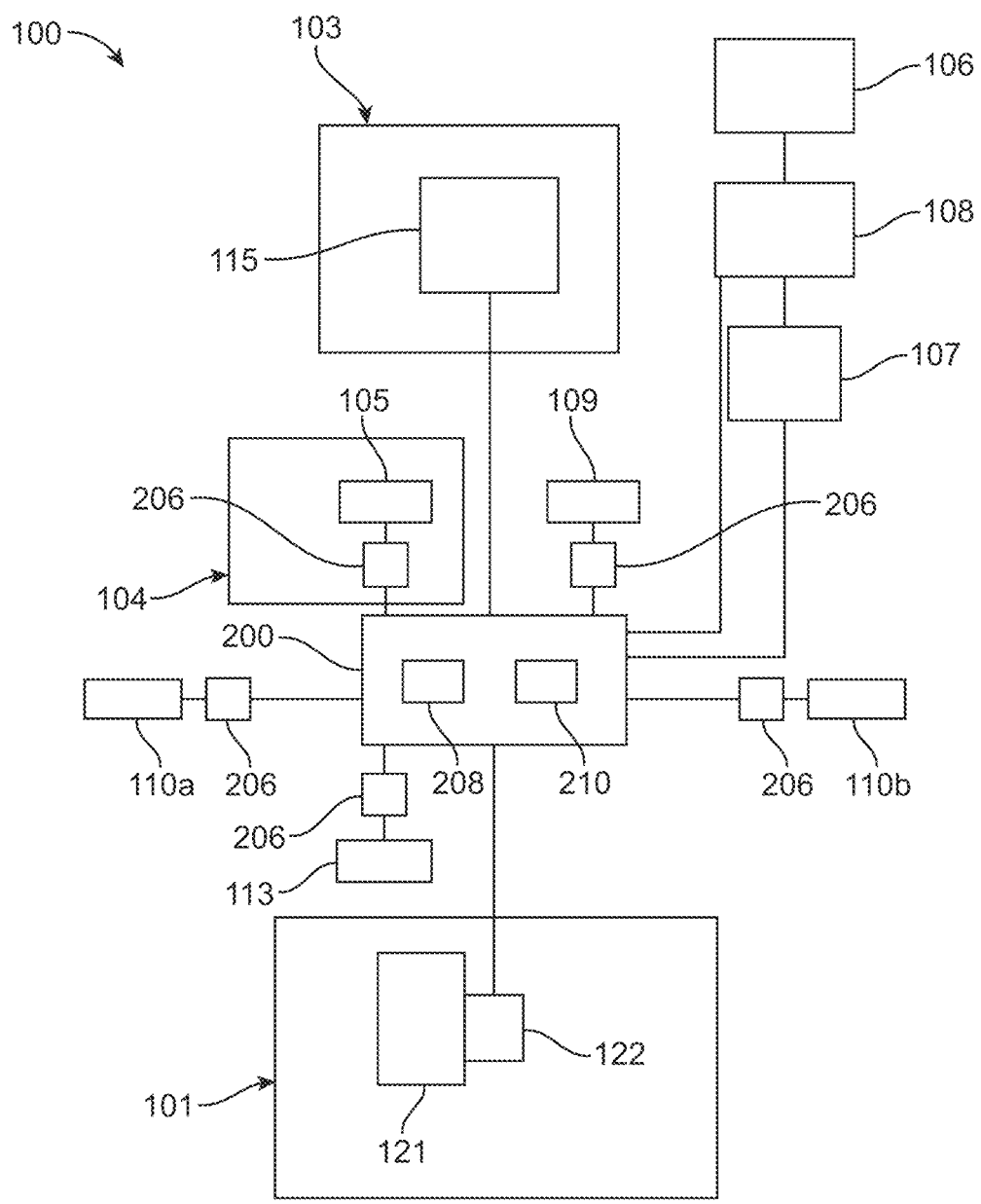
FIG. 6 is a diagrammatic view of an exemplary control system for use with the utility vehicles of FIGS. 1-5.

With additional reference to FIG. 6, a control system 104 can include at least the one power mode input 105, such as a push button, that can be manipulated by the user to select operation of the utility vehicle in one of the power modes (e.g., energy conservation mode, normal energy mode, etc.). The power modes have different energy use profiles. In general, in the energy conservation mode, energy is consumed more slowly and efficiently by the vehicle 100 than in the normal energy mode. In the normal energy mode, energy may be consumed more quickly. Each of the power modes can include at least one power operating state, with each of the power operating states further refining the energy efficiency and power consumption within the respective power mode. It is noted that the terms "energy conservation mode" and "normal energy mode" are relative to one another with respect to power operation (e.g., energy efficiency and power consumption). In other words, in some embodiments, the "energy conservation mode" may be considered the default system operating mode and the "normal energy mode" would be an increased power operating state such that it could function as a "power boost" (e.g., relative to energy conservation mode). Additionally, in some embodiments, a creep mode input 113 can be included for user manipulation to select operation of the utility vehicle in a "creep" mode. Operation of the vehicle 100 in the creep mode can provide small or refined movements of the traction system 101 and implement system 103.

FIG. 6 is a diagrammatic view of the control system 104 and related components of the vehicle 100 in accordance with embodiments of the present disclosure. As described above, the energy source 106, which may be a battery and/or generator, can provide energy to the electric motor 108, which can in turn provide power to the hydraulic pump 107. Note that diagrammatic interconnections shown in FIG. 6 between various components is for illustration purposes only and is not necessarily intended to illustrate the actual interconnections.

The control system 104 also includes the EC 200. The EC 200 can receive input signals from the power mode input 105, the implement control input 109 (inputs 109a-109c), the drive control input 110 (e.g., inputs 110a, 110b), and the attachment configuration or selector. The EC 200 may monitor various other functions and processes regarding vehicle operation.

The control system may include various sensors 206 adapted to detect and/or monitor position(s) of the control inputs (e.g., 105, 109, 110) and generate input status signals that are ultimately provided to the EC 200. The EC 200 can receive signals from sensors 206 associated with the control inputs for determination of the status of the respective inputs. As used herein, the monitoring of input statuses may include monitoring changes in the input statuses based on changes to the signals from the sensors corresponding to the respective input(s). Other sensors 206 can include current, voltage, temperature, state of charge (SOC), and other appropriate sensors.

For example, sensors 206 associated with the drive control inputs 110a, 110b provides signals to the EC 200 indicative of the user request for movement of the wheels 121a-121d in order to propel the utility vehicle 100. The implement control input 109 provides a signal to the EC 200 that is indicative of the user request to operate the implement 114. The energy mode input 105 provides an energy mode signal to the EC 200 indicative of a user request to select an energy mode (e.g., energy conservation mode, normal energy mode). The creep mode input 113 provides a signal to the EC 200 indicative of a user request to operate the vehicle in the creep mode. The EC 200 may receive signals from these inputs and, based upon pre-programmed logic, output commands to the electric motor 108 to provide power to the vehicle.

In response to the signals received, the EC 200 can continuously or periodically, determine suitable power consumption limitations corresponding to the user selected operating parameters (e.g., energy mode, implement, drive system, attachment configuration) of the vehicle and adjust between the plurality of operating power states to limit power consumption in response to changes in the vehicle operating parameters (e.g., implement and/or drive system not being employed for predetermined duration). The EC 200 can automatically determine a suitable operating power state, from a plurality of operating power states, based on the user selected power mode (e.g., energy conservation or normal) and current vehicle operating parameters, or vehicle functions being employed and change between the plurality of operating power states to limit power consumption as the vehicle functions change, as further described below with respect to FIGS. 7-10.

As shown in FIG. 6, the EC 200, which may be carried on the frame 102, may include a processor 208, memory 210, and other components necessary or beneficial to EC 200 operation. The memory 210 may include computer-readable instructions that, when executed, e.g., by the processor 208, cause the EC 200 to perform various functions. The memory 210 may include any volatile, non-volatile, magnetic, optical, and/or electrical media, such as a random-access memory (RAM), read-only memory (ROM), non-volatile RAM (NVRAM), electrically-erasable programmable ROM (EEPROM), flash memory, and/or any other digital media. While shown as both being incorporated into the EC 200, the memory and the processor could be contained in separate modules. Moreover, the EC 200 could be combined with other control modules so that multiple electronic functions of the vehicle are combined into one component.

In one or more embodiments, the exemplary systems, methods, and interfaces may be implemented using one or more computer programs using a computing apparatus such as the processor 208 and memory 210. Program code and/or logic described herein may be applied to input data to perform functionality described herein and generate desired output information. The output information may be applied as an input to one or more other devices and/or methods as described herein or as would be applied in a known fashion.

Figure 7:
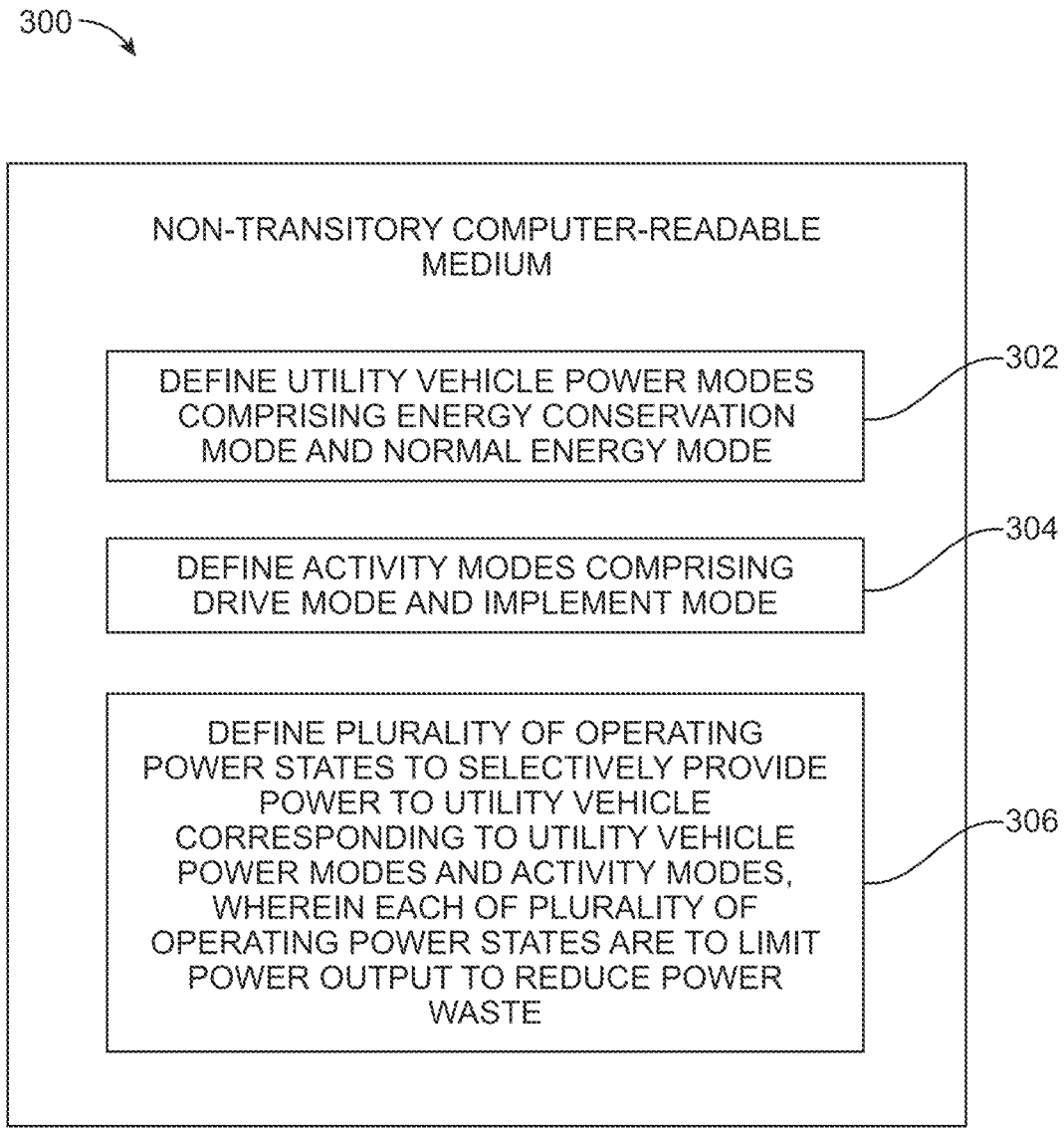
FIG. 7 is a block diagram of an example non-transitory computer readable medium including a set of instructions executable by a processor in accordance with embodiments of the present disclosure.

FIG. 7 is a block diagram of an example non-transitory computer readable medium 300 including a set of instructions executable by a processor (e.g., processor 208) in accordance with embodiments of the present disclosure. In one embodiment, non-transitory computer-readable storage medium 300 is included in the memory (e.g., memory 210) of the EC 200 and includes a set of instructions 302, 304, 306 executable by the processor 208. Instruction 302 can define utility vehicle power modes including an energy conservation mode and a normal energy mode. Instruction 304 can define activity modes selectable by a user, the activity modes including a drive mode and an implement mode. Instruction 306 can define a plurality of operating power states to selectively provide power to the utility vehicle corresponding to the utility vehicle power modes and the activity modes (e.g., implement mode and/or drive mode), wherein each of the plurality of operating power states are to limit power output to reduce power waste. Further, the EC 200 may include attachment configurations that correspond to the type of implement attached to the vehicle to modify or alter the plurality of operating power states.

Figure 8:
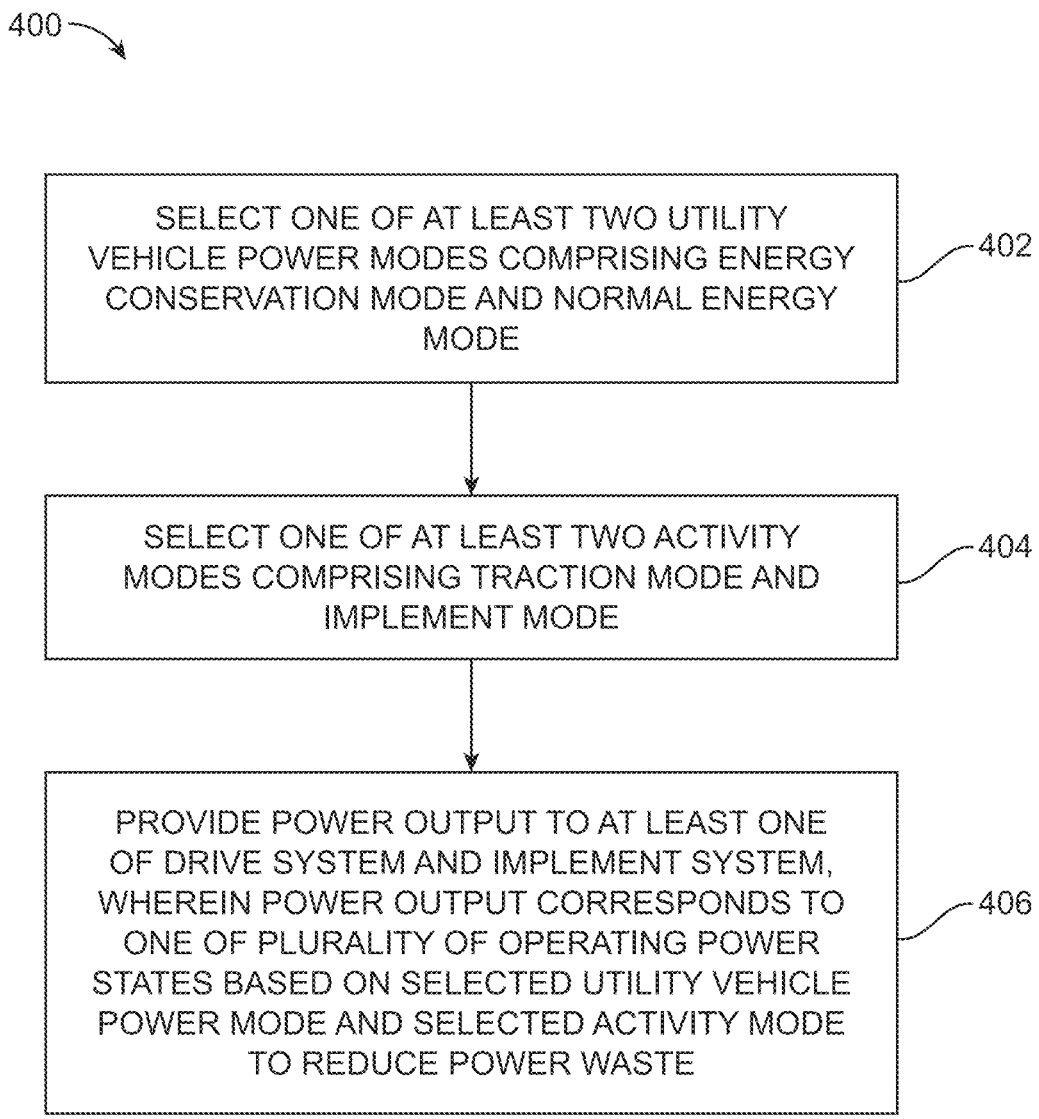
FIG. 8 is a flow diagram illustrating an example method of controlling utility vehicles in accordance with embodiments of the present disclosure.

FIG. 8 is a diagrammatic illustration of an example method 400 of controlling a utility machine in accordance with embodiments of the present disclosure. At 402, a user can select one of at least two utility vehicle power modes including an energy conservation mode and a normal energy mode. At 404, a user can select one of at least two activity modes including a drive mode and an implement mode. At 406, a power output can be provided to at least one of a drive system and an implement system, wherein the power output corresponds to one of a plurality of operating power states based on the selected utility vehicle power mode and selected activity mode to reduce power waste. Further, in one or more embodiments, the power output may be modified by the present attachment configuration (e.g., selecting the attachment) of the utility vehicle.

Figure 9:
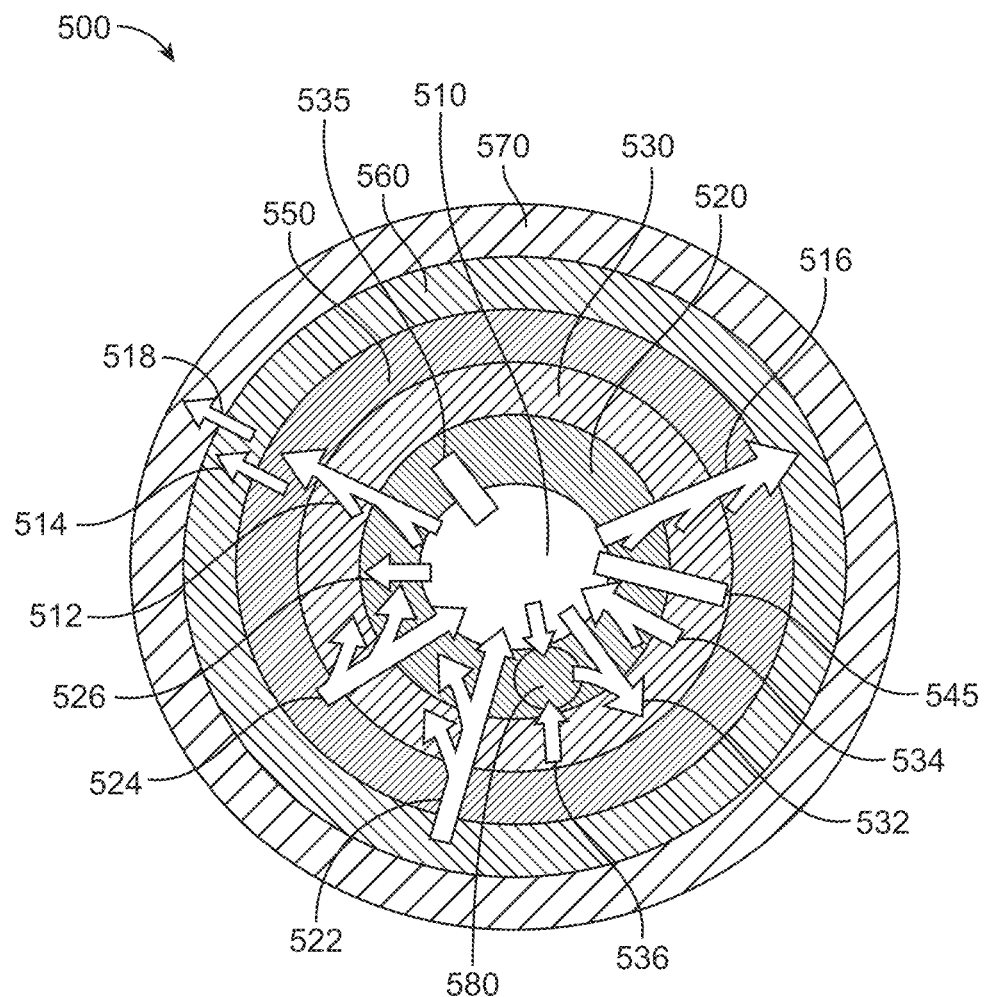
FIG. 9 is a functionality diagram illustrating an example method of controlling a utility vehicle in accordance with embodiments of the present disclosure.

FIG. 9 is a functionality diagram illustrating an exemplary method 500 of controlling a utility vehicle (e.g., vehicle 100) in accordance with embodiments of the present disclosure. FIG. 9 diagrammatically illustrates of a plurality of operating power states 510, 520, 530, 550, 560, and 570 for a utility machine operating in accordance with embodiments of the present disclosure. The plurality of operating power states described herein are by way of example only and are not to be viewed in a limited sense. Any number of operating power states can be employed in accordance with aspects of the present disclosure. The example method 500 is described further below with each of the plurality of operating power states described. After the operating power states are described, the parameters, or criteria, employed by the EC 200 in determining the appropriate operating power state to be selected, and changes between operating power states will be described. The method of controlling the utility vehicle employing the plurality of operating power states is described with reference to FIG. 9 and additional reference to the flow diagrams of FIGS. 10A and 10B.

In general, the EC 200 can control the power output (e.g., control the operating power state) of the electric motor 108 by selecting one of a plurality of operating power states to selectively deliver power to vehicle systems at levels sufficient to perform user-indicated functions, while reducing power waste to effectively increase overall vehicle runtime (i.e., conserve energy). In this regard, the plurality of operating power states can include multiple levels of current (e.g., torque) output and speed output of the motor 108, as described further below. In general, the vehicle can be operated in any one of, and be automatically switched between, the operating power states in response to user input or an absence of user input over predetermined durations indicated by the input status, as further described below.

The plurality of operating power states includes an initialization state 510, one or more intermediate power states (e.g., 520, 530, 550, 560) and a power off, or final power, state 570. The initialization, or full power, state 510 of the plurality of power operating states allows power to be consumed up to the maximum current output and maximum speed output of the electric motor 108. In some embodiments, the current output and speed output in the full power state 510 is the maximum available of the electric motor 108 (e.g., full power). By way of example, in one embodiment, the maximum current output, or current limit ($I_{lim}$), at the full power state 510 is 350 Amps root mean square ($A_{rms}$) and the maximum predetermined speed output ($\omega_o$) of the electric motor is 3000 Revolutions Per Minute (RPM). In the full power state 510, the available power supply is suitable for the power demands of multiple concurrent vehicle functions.

Vehicle functions can also be performed at a first intermediate power state 520 or a second intermediate power state 530 to reduce power output (from the maximum available from the electric motor) to a level sufficient to supply power to perform selected vehicle functions when the vehicle is being operated in the energy conservation mode (i.e., "eco" mode is selected using the input 105 (see FIG. 5)).

In the first intermediate power state 520, the maximum current output level and the maximum speed output of the electric motor 108 can be reduced from the maximums employed during the initialization, or full power, state 510. For example, in the first intermediate power state 520, the maximum current output ($I_{lim}$) can be limited to 180 $A_{rms}$ and the maximum speed output of the electric motor ($\omega_o$) can be limited to 2200 RPM. In one embodiment, the first intermediate power state 520 provides maximum current and motor speed outputs that are sufficient to operate one or both (albeit at reduced power) the traction system and the implement system while in the eco mode (e.g., energy conservation mode). In one or more embodiments, in the first intermediate power state, the eco mode may be engaged and allow for full operation of the traction system, with less (or no) power provided to the implement system.

In the second intermediate power state 530, the maximum current output limit and the maximum speed output limit of the electric motor are also less than the maximum speeds employed during the initialization, or full power, state 510 and can be employed when in the energy conservation mode. For example, the maximum current output ($I_{lim}$) can again be limited to 180 $A_{rms}$ and the maximum speed output of the electric motor ($\omega_o$) can be limited to 1850 RPM. In this second intermediate power state 530, sufficient power is supplied to the implement system for operation of the implement system. Moreover, in the second intermediate power state 530, the maximum current and motor speed outputs may be insufficient to adequately operate both the traction system 101 and the implement system 103 simultaneously (e.g., for full operation of the implement system, with less (or no) power provided to the traction system).

A creep mode 535 can also be employed when operating the vehicle in operating power states 510 or 520. Operation of the vehicle in the creep mode 535 provides for refined adjustments to the movements by one or both of the traction system and the implement system. In the creep mode, the maximum speed ($\omega_o$) of the electric motor 108 can be further reduced. For example, in some embodiments, the motor speed is reduced to a maximum of 500 RPM in creep mode. Similarly, the current output in the creep mode 535 can be limited to 350 $A_{rms}$, consistent with the full power state 510, or can be 180 $A_{rms}$, consistent with the first intermediate power state 520.

A parking brake mode 545 can be employed when operating the vehicle while the parking brake is engaged. Operation of the vehicle in the parking brake mode 545 does not affect the operating power state that is implemented. Rather, in the parking brake mode 545, the maximum speed output and the maximum current output will correspond with operating power state (e.g., 510, 520, 530) of the implement mode and the power mode (e.g., normal or eco) selected by the user. If the user manipulates the drive control input(s) while in the parking brake mode 545 (i.e., parking brake is engaged), the maximum speed output of the motor will reduce to 0 RPM until the EC 200 determines that the parking brake has been disengaged by the user and a different power state is appropriate.

In a third intermediate power state 550 and a fourth intermediate power state 560, the power supply can be further reduced to minimize power waste. The vehicle 100 can enter either of the third and fourth intermediate power states 550, 560 while operating in the energy conservation mode (i.e., "eco" mode) or the normal power mode. In the third intermediate power state 550, the motor speed output can be further reduced. For example, the motor speed output can be limited to 1000 RPM, while the current output can remain at the maximum current output level of any of the power states described above. In some embodiments, the current output at the third intermediate power state 550 can be consistent with the previously-operated power state of the vehicle. For example, the current output at the third intermediate power state 550 can remain at 350 $A_{rms}$, consistent with the full power state 510, or can remain at 180 $A_{rms}$, consistent with the first or second intermediate power states 520, 530.

In the fourth intermediate power state 560 of the plurality of operating power states, the maximum current output ($I_{lim}$) is 0 $A_{rms}$ and the maximum speed output of the electric motor ($\omega_o$) is 0 RPM. In the fourth intermediate power state 560, the EC 200 can remain active, or energized, to receive input signals from the user. In other words, the EC 200 may use minimal or no power (e.g., to remain electronically sentient), but all significant energy consumption (e.g., such as the electric motor 108) may be reduced to zero until at least one of the traction or implement systems is reengaged.

At a final power state 570, maximum current output of the electric motor is 0 $A_{rms}$ and the maximum speed output is 0 RPM, and the operational power supplied to the vehicle systems is terminated, e.g., the vehicle energy consumption is minimal or essentially ceases. While shown having first through fourth intermediate power states (e.g., 520, 530, 550, 560), embodiments providing more or less intermittent power states are also possible. For example, up to an infinite number of operating power states can be employed such that the EC 200 can continuously change the power consumed to correspond with the power demanded to produce minimal (e.g., substantially net zero) energy waste.

Furthermore, in embodiments wherein the vehicle includes a variable (as opposed to fixed) displacement hydraulic pump, the efficiency of the electric motor and the hydraulic motor combined may be optimized in order to most efficiently produce the hydraulic flow and pressure needed. Therefore, not only could the system reduce waste (e.g., reduce unnecessary energy creation) by not creating excess hydraulic power (e.g., by dumping it over relief valve and creating waste heat), it may also produce hydraulic power in a more efficient manner.

Figure 10A:
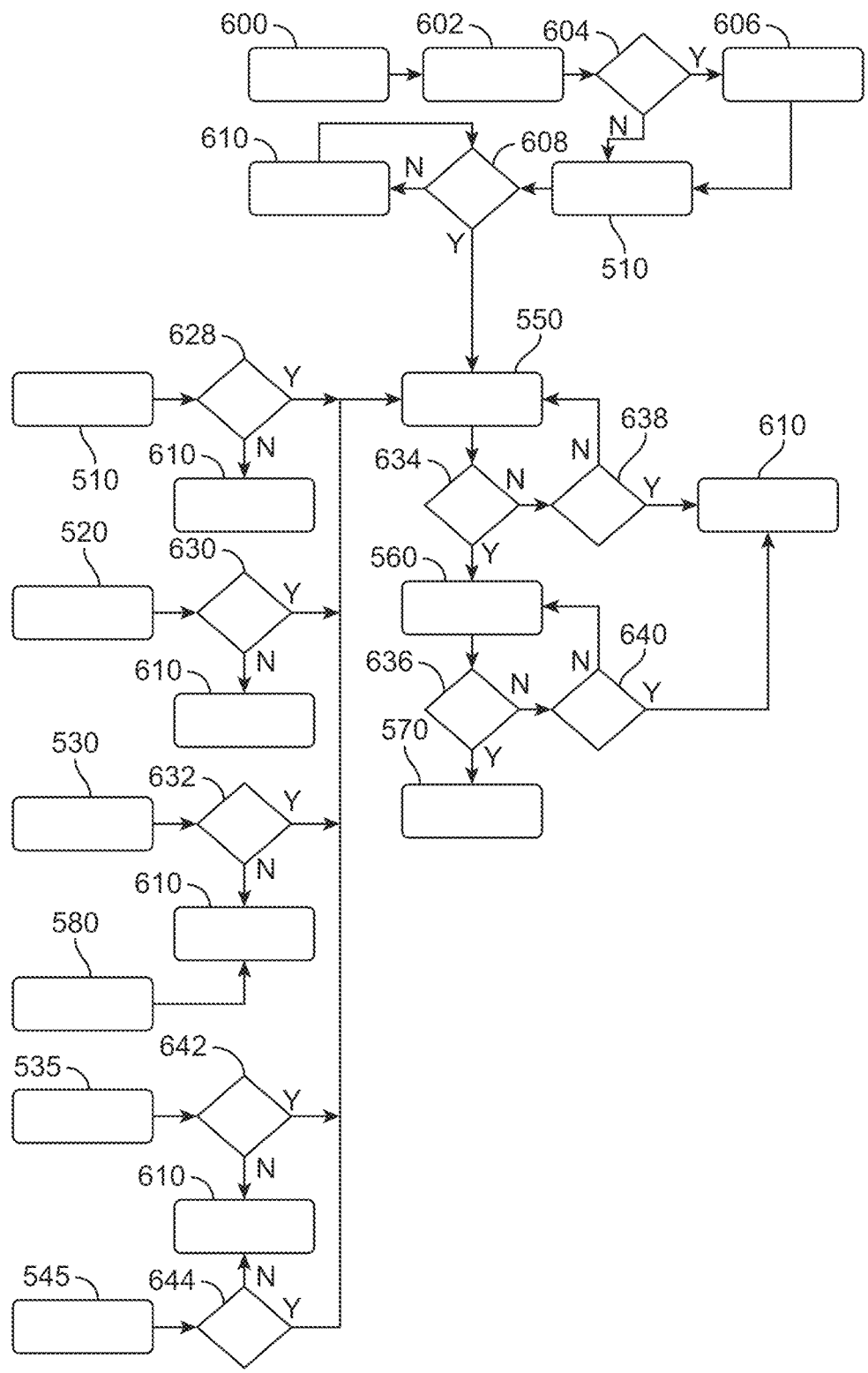
FIG. 10A is a flow diagram of the example method of controlling a utility vehicle illustrated in FIG. 9 in accordance with embodiments of the present disclosure.
Figure 10B:
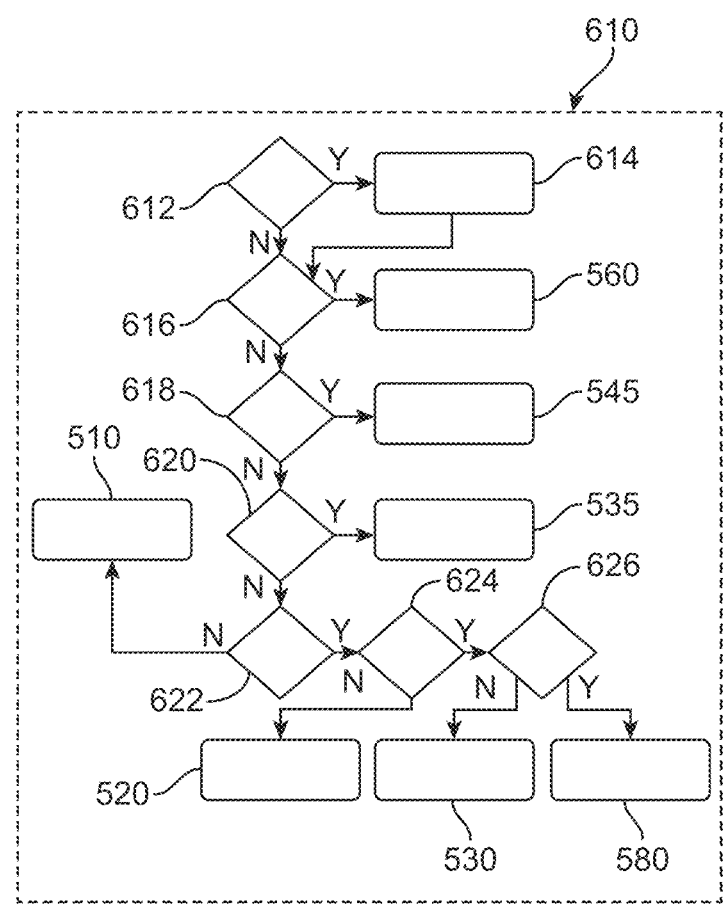
FIG. 10B is a flow diagram of a check input step provided in various locations of the flow diagram of FIG. 10A.

With continued reference to FIG. 9 and additional reference to FIGS. 10A and 10B, the methods employed in operating the vehicle having the plurality of operating power states 510, 520, 530, 550, 560, 570 will be further described. The EC 200 can estimate or otherwise determine the power limits of the vehicle needed to perform selected functions and can determine transitions, or changes, between power demands and correspondingly, automatically change between the above described plurality of power states 510, 520, 530, 550, 560, 570 to supply sufficient power when needed, but reduce output when vehicle function demands permit. Changes between operating power states 510, 520, 530, 550, 560, 570 are diagrammatically indicated with arrows in FIG. 9 and are further described with reference to the flow diagrams of FIGS. 10A and 10B. It is again noted that the attachment configuration of the vehicle may modify the power state profiles by altering the maximum current output and maximum speed output of each power state and/or altering the transition times between the power states for each particular attachment.

To begin operation of the vehicle 100, the vehicle can be powered on, or initialized. To power on the vehicle, the user can move the power on/off input at 600 (e.g., key; see 118 of FIG. 5) to an "on" position to initiate an inverter and motor power-up sequence at 602. In response to the power-on input and power-up sequence, the EC 200 can determine at 604 if a cold start sequence is to be employed at initialization, or full power state 510. For example, if the hydraulic oil temperature is "cold" (e.g., less than 0° Celsius (C)), as determined manually by the user or by a temperature sensor, the speed output of the electric motor can be increased at 606 to the maximum speed output over a first portion of a cold start duration (e.g., 5 seconds) and remain at the maximum speed output for a second portion of the cold start duration (e.g., an additional 5 seconds; total cold start duration of 10 seconds) during the initialization state. If the EC (or the user) determines that a cold start is not warranted (e.g., hydraulic oil temperature is greater than 0° C.), the initiation state can be engaged with only the power-on input and power-up sequence.

In some embodiments, the user may desire that the vehicle remain operating at full power after initialization in order to perform desired vehicle functions. In the initialization/full power state 510, the electric motor can provide the maximum current output and speed output as described above. The EC 200 can check the inputs at 610 (e.g., inputs 105, 109, 110) to determine if maximum power is needed, or if a reduced power state is warranted via detecting whether a change in the inputs has occurred or a duration of time has elapsed.

When checking the inputs at 610 (which occurs at various places in FIG. 10A and is shown expanded in FIG. 10B), the EC 200 first determines at 612 whether there are any input signals generated by, e.g., the implement system and/or the traction system and/or auxiliary power to implement (e.g., inputs 109, 110). If input signals indicate that the vehicle is actively operating, the EC 200 may reset a timer at 614 to a predetermined duration as discussed herein. If no input signals are present, the EC 200 may cycle through one or more mode verifications. For example, the EC 200 may verify at 616 whether the battery charger is connected to the vehicle 100, verify at 618 whether the parking brake mode (e.g., parking brake 119 in FIG. 5) is engaged, verify at 620 whether the creep mode (e.g., creep mode input 113 in FIG. 5) is engaged, and verify at 622 whether the eco mode (e.g., energy conservation mode) is engaged (e.g., on). If any of the battery charger, parking brake, or creep mode is engaged, the EC 200 may change the operating power state as described herein. If none of the battery charger, parking brake, creep mode, or eco mode is engaged (e.g., off), the EC 200 may determine that the full power state 510 of operation is appropriate. While this describes one sequence of cycling through one or more input checks, this disclosure contemplates any variation in this sequence.

Additionally or alternatively, if input signals indicate that the power demands of the vehicle functions selected are such that the full power state 510 is appropriate, the operating power state can be maintained at the full power state 510. Alternatively, if the EC 200 determines that the vehicle functions can be performed at a power state providing less power than supplied at the full power state 510 (e.g., operation of the drive system only, with no operation of the implement), the EC 200 can determine, assuming eco mode is engaged, an appropriate change to a different operating power state, such as the first intermediate power state 520 or the second intermediate power state 530, and the EC 200 will automatically change to the appropriate operating power state, as further described below. Specifically, if the EC 200 verifies at 622 that eco mode is engaged, the EC 200 then may determine at 624 whether the implement system is engaged (e.g., the hammer implement). If the implement system is not engaged, the EC 200 may change to the first intermediate power state 520 and if the implement system is engaged, the EC 200 may determine at 626 whether the traction system is engaged. If the traction system is not engaged (and the implement system is engaged), the EC may change to the second intermediate power state 530 and if the traction system is engaged (along with the implement system), the EC 200 may change to a traction power state 580 (e.g., as shown in FIG. 9) described further herein.

The EC 200 receives signals indicating the user's manipulation of control inputs at the "check inputs" subprocess 610 (see FIG. 10B) in order determine suitable changes from the full power state 510. While in either power mode (e.g., eco mode or normal energy mode), if the EC 200 determines that no request for power has been made during a predetermined duration, the EC 200 can determine a change of the operating power state to an operating power state that reduces power consumption (e.g., motor current and/or speed) is appropriate, as indicated with arrow 512 (e.g., see FIG. 9). For example, if after entering the initialization/full power state 510, no input signals indicating a change in at least one of the inputs (e.g., drive or implement control inputs, as initiated by a user) is received by the EC 200 during a first duration at 608, 628 (e.g., 5 seconds, 10 seconds, etc.), the operating power state may be automatically changed to the third intermediate power state 550 (e.g., $I_{lim}$=180 $A_{rms}$, $\omega_o$=1000 RPM). Similarly, if no signal indicating a change in at least one of the inputs is received by the EC 200 during a predetermined duration at 630, 632 (e.g., 5 seconds) while operating in either the first or second power state, 520, 530, the operating power state may be automatically changed to the third intermediate power state 550. Still further, if no signal indicating a change in at least one of the inputs is received by the EC 200 during a predetermined duration at 642, 644 (e.g., 5 seconds) while operating in either the creep mode 535 or parking brake engaged 545, the operating power state may also be automatically changed to the third intermediate power state 550. In one embodiment, if during a second duration at 634 (e.g., 25 seconds) after the passage of the first duration, the user has not manipulated an input indicating intention to use the vehicle, the EC 200 can automatically change operating power states from the third intermediate power state 550 to the fourth intermediate power state 560 (e.g., $I_{lim}$=0 $A_{rms}$, $\omega_o$=0 RPM) to limit vehicle power consumption, as indicated by arrow 514 in FIG. 9. The operating power state can be automatically changed as indicated by arrows 512 and 514 while the creep mode 535 and/or parking brake mode 545 are either on or off. Additionally or alternatively, as indicated with arrow 516, the EC 200 may automatically change operating states to the fourth intermediate power state 560 from the full power state 510, or the first, second, or third intermediate power states 520, 530, 540 if the power supply charger is connected, as determined by the EC 200 when checking inputs.

If, after the vehicle has entered the fourth intermediate power state 560, a third duration as identified at 636 (e.g., another 4 minutes and 30 seconds, 5 minutes, etc.) passes without the EC receiving input signals, the EC 200 can determine that no power is needed to operate the vehicle and the operating power state can be changed to the power off, or final, power state 570, as indicated with arrow 518 in FIG. 9. The operating power state can be automatically changed as indicated by arrow 518 while the creep mode 535 and/or parking brake mode 545 are either on or off. At the system off power state 570, limited or no power is provided to the vehicle. After entering the power state 570, in order to perform any vehicle functions, the user must again begin initialization of the vehicle, as described above.

At each of the changes to one of the plurality of operating power states upon passage of the predetermined duration(s) in which no signals are received by the EC indicating user intention to use the vehicle, at least one of the current output and the speed output of the motor can be reduced. In one embodiment, each of the first, second, third, etc. predetermined durations can be different (e.g., longer, shorter). Alternatively, two or more of the predetermined durations can be equivalent.

In one embodiment, if an input signal is received by the EC 200 while the vehicle is operating in the third intermediate power state 550, the EC 200 can change the operating power state to the operating power state employed prior to entering the third intermediate power state 550, or change to a different operating power state (e.g., 530, 520) that corresponds to the user input employed, as indicated with arrow 524 in FIG. 9. For example, the user can manipulate the drive control input (e.g., a single tapping movement as indicated at 638) to return to the previous operating energy state. From the third intermediate power state 550, the current output and motor speed are at levels that can be quickly and efficiently returned to the full power state as indicated with arrow 524.

Similarly, if the user manipulates a user control input when the vehicle is in the fourth intermediate power state 560 (prior to the passage of the third duration, e.g., 4 minutes and 30 seconds or 5 minutes), the EC 200 can determine the appropriate change of operating power states corresponding to the user input, as indicated by arrow 522. In one embodiment, if the user engages the drive control input (e.g., 110a or 110b in FIG. 5) in a prescribed manner (e.g., tapping twice within one second as indicated at 640), the vehicle returns to the power state that the vehicle was operating in prior to entering the fourth intermediate power state 560, as indicated with arrow 522. From the fourth intermediate power state 560, the current output and motor speed can be returned to the previously employed operating power state, or changed to a different operating power state (e.g., 530, 520) that corresponds to the user input employed, without requiring the electric motor to be re-initialized.

In some embodiments, the user elects to employ and operate the vehicle in the energy conservation (i.e., eco) mode to maximize energy conservation, and extend the availability of power supplied from the power source during vehicle operation. For example, if after entering the initialization/full power state 510 (and prior to the passage of the first duration), the user initiates operation of the machine in the energy conservation mode via manipulation of switch 105 and selects a desired implement (e.g., bucket, auger, etc.) through the attachment configuration (which, e.g., may not affect the machine operation in energy conservation mode), the EC 200 receives the input signals and transitions the vehicle from the full power state 510 to the first intermediate power state 520, as indicated by arrow 526. The first intermediate power state may be suitable to supply sufficient power to support the vehicle function (e.g., for the selected implement attachment). With the desired implement selected, once the energy conservation mode is selected, the machine operates in the energy conservation mode. The user can engage any combination of the drive system and the implement system, and the vehicle will remain in the first intermediate power state 520 until the energy conservation mode is deselected. The machine will continue to operate in the operating power state 520 upon deselection of the selected attachment. The machine will return to power operating state 510 (e.g., indicated by arrow 534) upon deselection of eco mode.

In another embodiment including operation of the vehicle in the energy conservation mode, the power operating state may be automatically changed by the EC 200 based upon the type of implement selected and by receiving additional inputs. For example, if the user selects an implement attachment (e.g., a reciprocating hammer) and then selects eco mode, the EC 200 may switch immediately to the second intermediate power state 530 (e.g., as indicated by arrow 532). As the user manipulates the machine and selects the traction system, then the EC 200 may detect the need for more power and automatically move to the first intermediate power state 520, but will be operating in mode 580 (e.g., as indicated by arrow 536) as described herein. When the traction system is released, the EC 200 may detect the need for less power and may transition back (e.g., automatically return) to the second intermediate power state 530 (e.g., as indicated by the on-ramp portion of arrow 532).

As an illustrative example, after the user powers on the vehicle by manipulating the power on/off input 118 (see, e.g., FIG. 5), the electric motor 108 initializes and automatically enters the initialization state 510, operating at full power. The user manipulates the creep mode input 113 to select the creep mode to reduce the motor RPM in order to precisely maneuver the vehicle out of a tight storage space, and then returns to full speed once in an appropriately clear location; creep mode is then deselected. The user then selects the "hammer" as the attached implement (e.g., the attachment configuration) at the input display 128 (see, e.g., FIG. 5), and the machine remains in the operating power state 510. The user manipulates the drive control inputs 110 within 5 seconds of initializing in order to move or relocate the vehicle to a target work location to complete demolition work. The vehicle operates in the full power state 510 to engage the drive system to move the vehicle to the target work location. The user stops the vehicle and engages the energy conservation mode by manipulating the input 105 to conserve and maximize the remaining energy to perform the demolition. In response to the input signals indicating that the energy conservation mode is employed and the drive system is not employed, the vehicle automatically changes power states to the second intermediate power state 530 and the motor speed limit reduces to 1850 RPM and the current output limit reduces to 180 $A_{rms}$. The user then engages the drive inputs 110 during the final approach to the target work location, automatically transitioning at arrow 536 to a traction power state 580 that defines a motor speed and current output similar to that of the first intermediate operating power state 520, however, the operating inputs are different from the first intermediate operating power state 520 (e.g., the traction system is engaged, but the implement tool is not engaged).

Once at the target work location, the user releases the drive control inputs 110 and the vehicle transitions, after a duration of 5 seconds, to the second intermediate power state 530 (e.g., due to no longer engaging the traction system). The user may then engage the implement 114 by manipulating the control inputs 109 to lower the hammer to the demolition target and initiate auxiliary power to begin reciprocating the hammer by engaging input 109c. If the hammer slips off a specific location, for example, and the operator wishes to rotate the vehicle to move the hammer a small distance to return the hammer to the specific location, the input 109c is disengaged, drive inputs 110 are activated, and the machine shifts to the traction power state 580. The automatic motor speed increase to 2200 RPM allows the vehicle and the implement 114 to be quickly repositioned (i.e., the user may then refine the position of the vehicle and the implement 114). The user then re-engages input 109c and the vehicle transitions to the second intermediate power state 530 to operate the hammer at the adjusted location. The motor speed limit of the vehicle then returns to 1850 RPM (second intermediate power state 530) to continue the demolition with the hammer.

The user may then desire to move the vehicle to the original or a new location. If the user realizes that the remaining power supply of the electric motor 108 is insufficient to return to the original or new location, the user may engage the parking brake 118 and the battery may be connected to a charger for recharging. The EC 200 detects these inputs and changes the operating power state to the fourth intermediate power state 560 and reduces the current output to 0 $A_{rms}$ and the motor speed to 0 RPM. The battery charges for 30 minutes, for example, and is then disconnected and the parking brake 119 is disengaged. The user may double tap the drive control inputs 110a or 110b to return the vehicle 100 to the second intermediate power state 520. The user may further manipulate the control input 110 to engage the traction system to move the vehicle to another location. The eco mode may still be engaged to conserve the energy supply of battery and the EC may change the operating power state to the first intermediate power state 510 to provide sufficient power to engage the traction system and move the vehicle to the new intended location. Once at the intended location, it is possible that the user may not engage any of the inputs, wherein the EC automatically reduces power states after the passage of each predetermined duration (e.g., first, second, etc.), as described herein, until the vehicle is powered off in the final power state 570.

In accordance with aspects of the present disclosure, any of the plurality of operating power states (e.g., 510, 520, 530, 550, 560, 570, 580) can be entered and re-entered as appropriate to achieve energy efficiency and operate the appropriate systems, as indicated via user inputs. The EC receives input signals corresponding to the selected vehicle functions, or operations, and can determine that the power state that is appropriate to limit the provided power based on the signals received, or not received, during predetermined durations and operations.

Illustrative embodiments are described, and reference has been made to possible variations of the same. These and other variations, combinations, and modifications will be apparent to those skilled in the art, and it should be understood that the claims are not limited to the illustrative embodiments set forth herein.

What is claimed is:
1. A control system of a utility vehicle, the control system comprising:
a controller comprising memory to store instructions and a processor to process the instructions to select one of a plurality of operating power states of the utility vehicle, the utility vehicle comprising an electric motor and a hydraulic pump;

an energy mode input electrically coupled to the controller to provide a power state input signal indicative of a user input request to select one of at least two power modes;

an implement control input electrically coupled to the controller to provide an implement movement signal indicative of a user input request to select a movement of an implement; and a drive control input electrically coupled to the controller to provide a drive signal indicative of a user input request to select a movement of a drive system to propel the utility vehicle, wherein the controller is adapted to determine a change from one of the plurality of operating power states to another of the plurality of operating power states in response to at least one user input request to select a movement of at least one of the implement and the drive system indicating a reduction of power consumption, and wherein each of the plurality of operating power states comprises a maximum electric current output and a maximum speed output of the electric motor.

2. The control system of claim 1, wherein the at least two power modes comprises an energy conservation mode and a normal energy mode.

3. The control system of claim 1, further comprising a creep mode input.

4. The control system of claim 1, wherein the controller is adapted to determine a change from one of the plurality of operating power states to another of the plurality of operating power states in response to a status of input signals during a predetermined duration.

5. The control system of claim 1, wherein the plurality of operating power states comprises:

a first power state having a maximum available electric current output and a maximum available speed output of the electric motor, and an intermediate power state having at least one of the electric current outputs and speed outputs of the electric motor less than the maximum available electric current output and output of the electric motor.

6. The control system of claim 5, wherein the plurality of operating power states further comprises:

a final power state wherein the maximum electric current output of the electric motor is 0 Amps root mean square and the maximum speed output is 0 revolutions per minute.

7. The control system of claim 1, wherein the user input is to select a movement of at least one of the implement and the drive system indicating an increase or decrease in power consumption.

8. The control system of claim 1, wherein the controller is adapted to determine a change to another of the plurality of operating power states in response to a user input to indicate a change in at least one of implement system and drive system.

9. The control system of claim 1, further comprising an attachment configuration, wherein the controller is adapted to modify the plurality of operating power states of the utility vehicle based on the attachment configuration.

10. A utility machine comprising:
a frame comprising a front end and a rear end;
an electric motor;
a hydraulic pump coupled to the electric motor;
a drive system to propel the utility machine over a ground surface, the drive system to receive hydraulic power from the hydraulic pump;

an implement system including an implement operable with hydraulic power received from the hydraulic pump;

first and second control inputs to receive user input corresponding to one or more operational parameters of the drive system and the implement system;

an energy mode input;

input sensors configured to detect manipulation of the energy mode input and the first and second control inputs, respectively, and generate a corresponding energy mode input signal and first and second input signals; and an electronic controller configured to receive an energy mode input signal and a signal representing one or more operational parameters of the vehicle, wherein the controller is adapted to determine electric motor power consumption limits based upon the energy mode input signal and the signal representing the one or more operational parameters;

wherein the power is automatically adjusted based on a second signal representing a change in the one or more operational parameters.

11. The utility machine of claim 10, wherein the implement is a reciprocating hammer.

12. The utility machine of claim 10, comprising:
a battery energy source to power the electric motor.

13. The utility machine of claim 10, wherein the electronic controller is adapted to modify the power consumption limits based on an attachment configuration, wherein the implement defines the attachment configuration.

14. The utility machine of claim 10, wherein the energy mode input comprises an energy conservation mode and a normal energy mode.

15. The utility machine of claim 10, wherein the electronic controller is adapted to change from one power consumption limit to another power consumption limit in response to the signal representing the one or more operational parameters during a predetermined duration.

16. A method of controlling a utility machine comprising:
selecting one of at least two utility vehicle power modes comprising an energy conservation mode and a normal energy mode;

selecting one of at least two activity modes comprising a drive mode and an implement mode; and providing a power output to at least one of a drive system and an implement system, wherein the power output corresponds to one of a plurality of operating power states based on the selected utility vehicle power mode and selected activity mode to reduce power waste.

17. The method of claim 16, wherein the operating power states define a maximum electric current output and a maximum speed output of an electric motor.

18. The method of claim 16, further comprising modifying the plurality of operating power states based on an attachment configuration of the utility machine.

19. The method of claim 16, further comprising changing from one of the plurality of operating power states to another of the plurality of operating power states in response to input signals of the selected activity mode during a predetermined duration.

* * * * *